UNITED STATES PATENT OFFICE.

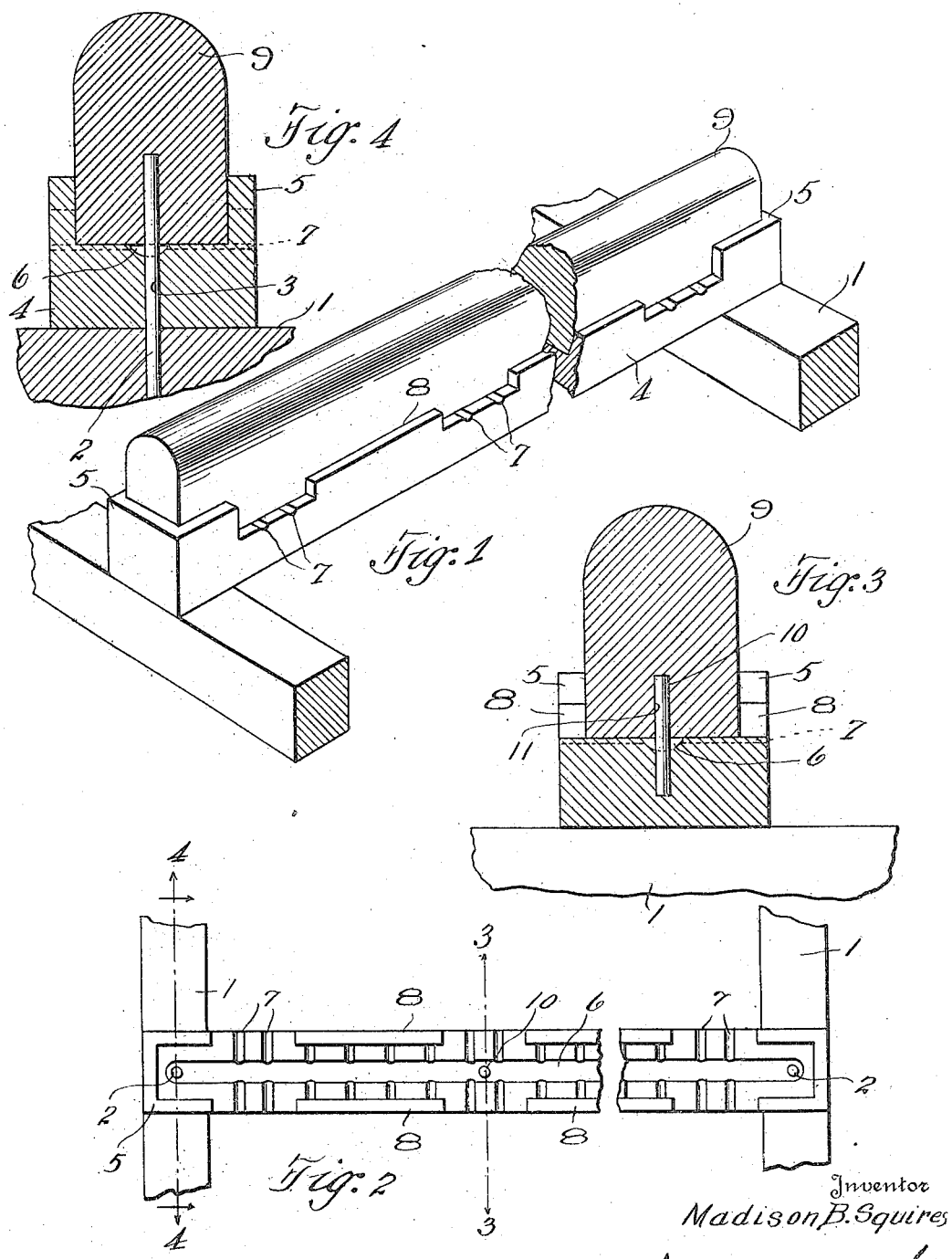

MADISON B. SQUIRES, OF WALTON, NEW YORK.

HEN-ROOST.

1,255,655. Specification of Letters Patent. Patented Feb. 5, 1918.

Application filed November 21, 1916. Serial No. 132,654.

*To all whom it may concern:*

Be it known that I, MADISON B. SQUIRES, a citizen of the United States of America, residing at Walton, in the county of Delaware and State of New York, have invented certain new and useful Improvements in Hen-Roosts, of which the following is a specification.

This invention relates to roosts such as are usually placed in chicken houses or like places and upon which the hens or chickens may perch.

The object of the invention is to provide a roost in which the vermin which so often infest chickens may find a hiding place for themselves and in which they may form their nests, the roost being so constructed that it may be easily taken apart to render such hiding places accessible so that the same may be cleaned of the vermin and their eggs.

With these and such other objects in view as may hereinafter more fully appear, my invention consists in the novel arrangement and construction of parts set forth in the following description, more particularly pointed out in the claim, and which are shown in the accompanying drawing, wherein:—

Figure 1 is a perspective view of a roost constructed according to my invention, the side supports being shown broken away;

Fig. 2 is a plan view showing the perch-bar of the roost removed;

Fig. 3 is a cross section taken on the line 3—3 of Fig. 2, the perch-bar being in place;

Fig. 4 is a cross section taken on the line 4—4 of Fig. 2, the perch-bar being in place.

Referring to said drawing by numerals:—

The side supports for the bars or roosts are indicated at 1, each of which supports is provided with a series of spaced, upstanding studs or spikes 2, each of which is adapted to enter a suitable bore 3 formed in the perch or roost, for the purpose of retaining the same in place.

The perch or roost consists of a lower bar 4 each end of which is provided with a compartment or boxing 5 which is adapted to receive and surround the end of the perch bar member. Centrally located on the lower bar 4, and extending longitudinally thereof, is a groove or depression 6 access to which is had through a series of shallow grooves 7 which extend transversely of the bar 4. At spaced intervals along each side of the bar 4 the upstanding flanges 8 may be formed for the purpose of retaining the perch bar 9, which rests upon the lower bar 4, and also as tending to exclude light from between the perch 9 and bar 4. The perch 9 is further securely, but detachably held upon the bar 4 by means of the stud 10 which is carried by the bar 4 and adapted to enter the bore 11 formed in the perch bar 9.

As will be readily understood, a series of bars or roosts are placed along the supports 1 and upon these the chickens perch when sleeping. In the morning the vermin leave the chickens and seek dark crevices in which to hide and form their nests, such hiding places being provided by the grooves in the lower bar 4, by the boxed in ends 5 and the flanges 8. During the day the roosts may be removed, the perch bar 9 separated from the bar 4 and the parts scalded with hot water or otherwise cleansed of the vermin and their eggs.

Having described my invention, what I claim as new and desire to secure by Letters Patent is:—

A hen roost, including supports, and roost bars detachably secured to the supports, said roost bars consisting of a lower channel bar having closed ends, the side flanges of said channel bar provided with spaced cut-away portions, there being a longitudinal groove in the channel bar and transverse grooves communicating with the longitudinal groove and situated at the cut-away portions, and a perch bar detachably mounted in the channel bar.

In testimony whereof I hereunto affix my signature.

MADISON B. SQUIRES.

Copies of this patent may be obtained for five cents each, by addressing the "Commissioner of Patents, Washington, D. C."